US006555507B2

(12) United States Patent
Chatterji et al.

(10) Patent No.: US 6,555,507 B2
(45) Date of Patent: Apr. 29, 2003

(54) SEALING SUBTERRANEAN ZONES

(75) Inventors: Jiten Chatterji, Duncan, OK (US);
Roger S. Cromwell, Walters, OK (US);
Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 164 days.

(21) Appl. No.: 09/850,223

(22) Filed: May 7, 2001

(65) Prior Publication Data

US 2001/0032723 A1 Oct. 25, 2001

Related U.S. Application Data

(62) Division of application No. 09/244,820, filed on Feb. 4, 1999, now Pat. No. 6,271,181.

(51) Int. Cl.[7] .............................. C09K 3/10; C09K 7/00; E21B 33/13
(52) U.S. Cl. ....................... 507/219; 166/281; 166/293; 166/295; 166/300; 507/220; 507/269; 507/901
(58) Field of Search ................................. 507/219, 220, 507/269, 901; 166/281, 293, 295, 300

(56) References Cited

U.S. PATENT DOCUMENTS

| | | | |
|---|---|---|---|
| 2,637,692 A | 5/1953 | Nahin | 252/8.5 |
| 2,675,353 A | 4/1954 | Dawson | 252/8.5 |
| 2,815,079 A | 12/1957 | Goins, Jr. et al. | 166/29 |
| 3,082,823 A | 3/1963 | Hower | 166/29 |
| 3,208,525 A | 9/1965 | Caldwell et al. | 166/33 |
| 3,308,884 A | 3/1967 | Robichaux | 166/33 |
| 3,310,111 A | 3/1967 | Pavlich et al. | 166/33 |
| 3,310,511 A | 3/1967 | Reinert | 260/29.2 |
| 3,416,604 A | 12/1968 | Rensvold | 166/33 |
| 3,467,208 A | 9/1969 | Kelly, Jr. | 175/72 |
| 3,612,181 A | 10/1971 | Brooks, Jr. | 166/295 |
| 3,705,116 A | 12/1972 | Vargin et al. | 260/2.5 |
| 3,724,564 A | 4/1973 | Messenger | 175/72 |
| 3,730,271 A | 5/1973 | Gall | 166/294 |
| 3,750,768 A | 8/1973 | Suman, Jr. | 175/72 |
| 3,763,070 A | 10/1973 | Shearing | 260/29.2 |
| 3,769,250 A | 10/1973 | Nikles, Jr. | 260/29.2 |
| 3,782,466 A | 1/1974 | Lawson et al. | 166/254 |
| 3,894,977 A | 7/1975 | Brown et al. | 260/18 EP |

(List continued on next page.)

FOREIGN PATENT DOCUMENTS

| | | | | |
|---|---|---|---|---|
| EP | 0 280 341 A1 | 8/1988 | | E21B/43/26 |
| EP | 0 553 566 A1 | 12/1992 | | E21B/43/04 |
| EP | 0 802 253 A1 | 10/1997 | | C09K/7/02 |
| FR | 1315462 | 12/1962 | | |
| FR | 0 91 377 A1 | 4/1983 | | C04B/13/24 |
| FR | 2 701 733 | 8/1994 | | E21B/43/32 |
| GB | 1019122 | 2/1966 | | E02D/3/14 |
| GB | 2 108 175 A | 5/1993 | | C09K/7/06 |
| NL | 31 35 892 A1 | 9/1981 | | C08L/1/26 |
| WO | WO 81/00874 | 4/1981 | | E21B/21/12 |
| WO | WO 91/02703 | 3/1991 | | C04B/24/24 |
| WO | WO 94/12445 | 6/1994 | | C04B/26/18 |
| WO | WO 96/00762 | 1/1996 | | C09K/7/06 |

OTHER PUBLICATIONS

Abstract No. 129:179103 entitled "High–Strength Cement Hardened Bodies With Water Resistance And Its Manufacturing Method" By Yoshihiko Oohama.
Abstract No. 131:215399 entitled "Biodegradable Polymer Moldings With Good Water Resistance" by Masashi Achinami et al.
Abstract No. 133:21349 entitled "Mixes for Macroporous Concrete" By Marin Stanclescu.
Abstract No. 104:38839 entitled "Use Of An Aqueous Epoxy Resin Emulsion In Preparing Aerated Concrete" by Hermann Volland et al.
Abstract No. 124:64550 entitled "Hydraulic Compositin for High–Strength Polymer Concrete" by Tadao Sakurai.
Abstract No. 125:283143 entitled "Rapid Hardening Cement–Epoxy Resin Compositions with Segregation Prevention" by Jinichi Omi.
Abstract No. 78:137411 entitled "Hardenable Resin Comositions" by Hiroshi Komoto.
Abstract No. 93:119277 entitled "Binder Mixture For Mortar" by Karl Hermann Conrad et al.
Abstract No. 102:208395 entitled "Chemical Admixtures For Cement".
Abstract No. XP–002069565; Derwent Publications, Ltd.
Abstract No. XP–002069606; Derwent Publications, Ltd.
Abstract No. XP–002069605; Derwent Publications, Ltd.
Abstract No. 127:209378 dated Jul. 30, 1997.
Abstract No. 115:216962 entitled "Conditioning of Spent Ion Exchange Resins By Embedding In Compound Matrixes", by C.J. Kertesz.
Waste Management, Tucson, AZ, 1991, vol. 2, pp. 381–386.
Abstract No. XP–002069564; Derwent Publications, Ltd.
Abstract No. XP–002069604; Derwent Publications, Ltd.
Abstract No. XP002146282 dated Oct. 15, 1982; Derwent Publications, Ltd.
Abstract No. XP002146283 dated Oct. 12, 1977; Derwent Publications, Ltd.
Abstract No. XP002145741 dated Mar. 12, 1996; Derwent Publications, Ltd.
Abstract No. XP002145742 dated Apr. 15, 1993; Derwent Publications, Ltd.
Abstract No. 118:221769 dated Jan. 13, 1993.
Abstract No. 118:239641 dated Feb. 09, 1993.

Primary Examiner—Jill Warden
Assistant Examiner—LaToya Cross
(74) Attorney, Agent, or Firm—Craig W. Roddy; C. Clark Dougherty, Jr.

(57) ABSTRACT

The present invention provides improved compositions and methods of using the compositions for sealing subterranean zones. The compositions are basically comprised of water, an aqueous rubber latex, an organophillic clay, sodium carbonate, an epoxy resin and a hardening agent for said epoxy resin.

15 Claims, No Drawings

U.S. PATENT DOCUMENTS

| | | | |
|---|---|---|---|
| 3,933,204 A | 1/1976 | Knapp | 166/295 |
| 3,960,801 A | 6/1976 | Cole et al. | 260/33.6 |
| 3,976,135 A | 8/1976 | Anderson | 166/276 |
| 4,042,031 A | 8/1977 | Knapp | 166/276 |
| 4,042,032 A | 8/1977 | Anderson et al. | 166/276 |
| 4,072,194 A | 2/1978 | Cole et al. | 166/295 |
| 4,101,474 A | 7/1978 | Copeland et al. | 260/13 |
| 4,107,112 A | 8/1978 | Latta, Jr. et al. | 260/18 |
| 4,113,015 A | 9/1978 | Meijs | 166/295 |
| 4,127,173 A | 11/1978 | Watkins et al. | 166/276 |
| 4,173,999 A | 11/1979 | Messenger | 166/293 |
| 4,189,002 A | 2/1980 | Martin | 166/295 |
| 4,199,484 A | 4/1980 | Murphey | 260/13 |
| 4,215,001 A | 7/1980 | Elphingstone et al. | 252/8.55 C |
| 4,216,829 A | 8/1980 | Murphey | 166/276 |
| 4,220,566 A | 9/1980 | Constien et al. | 260/13 |
| 4,272,384 A | 6/1981 | Martin | 252/8.55 R |
| 4,336,842 A | 6/1982 | Graham | 166/276 |
| 4,339,000 A | 7/1982 | Cronmiller | 166/295 |
| 4,360,120 A | 11/1982 | Samuel et al. | 524/494 |
| 4,367,300 A | 1/1983 | Aoki et al. | 524/2 |
| 4,368,136 A | 1/1983 | Murphey | 252/316 |
| 4,368,828 A | 1/1983 | Sameul et al. | 220/81 R |
| 4,383,054 A | 5/1983 | Schulzer et al. | 523/131 |
| 4,397,354 A | 8/1983 | Dawson et al. | 166/294 |
| 4,439,328 A | 3/1984 | Moity | 252/8.5 LC |
| 4,442,241 A | 4/1984 | Drake et al. | 523/130 |
| 4,483,888 A | 11/1984 | Wu | 427/336 |
| 4,489,785 A | 12/1984 | Cole | 166/295 |
| 4,503,170 A | 3/1985 | Drake et al. | 523/130 |
| 4,532,052 A | 7/1985 | Weaver et al. | 252/8.55 R |
| 4,537,918 A | 8/1985 | Parcevaux et al. | 523/130 |
| 4,558,075 A | 12/1985 | Suss et al. | 523/216 |
| 4,566,977 A | 1/1986 | Hatfield | 252/8.5 C |
| 4,569,971 A | 2/1986 | Sasse et al. | 525/109 |
| 4,620,993 A | 11/1986 | Suss et al. | 427/407.1 |
| 4,633,950 A | 1/1987 | Delhommer et al. | 166/295 |
| 4,643,255 A | 2/1987 | Sandiford et al. | 166/295 |
| 4,665,988 A | 5/1987 | Murphey et al. | 166/295 |
| 4,718,492 A | 1/1988 | Van Laar | 166/295 |
| 4,740,319 A | 4/1988 | Patel et al. | 252/8.515 |
| 4,741,401 A | 5/1988 | Walles et al. | 166/100 |
| 4,767,460 A | 8/1988 | Parcevaux et al. | 106/90 |
| 4,773,482 A | 9/1988 | Allison | 166/270 |
| 4,785,884 A | 11/1988 | Armbruster | 166/280 |
| 4,829,100 A | 5/1989 | Murphey et al. | 523/131 |
| 4,836,940 A | 6/1989 | Alexander | 252/8.512 |
| 4,921,047 A | 5/1990 | Summers et al. | 166/276 |
| 4,972,906 A | 11/1990 | McDaniel | 166/276 |
| 5,090,478 A | 2/1992 | Summers | 166/278 |
| 5,095,987 A | 3/1992 | Weaver et al. | 166/276 |
| 5,107,928 A | 4/1992 | Hilterhaus | 166/293 |
| 5,133,409 A | 7/1992 | Bour et al. | 166/293 |
| 5,151,131 A | 9/1992 | Burkhalter et al. | 106/822 |
| 5,159,980 A | 11/1992 | Onan et al. | 166/294 |
| 5,162,060 A | 11/1992 | Bredow et al. | 106/808 |
| 5,168,928 A | 12/1992 | Terry et al. | 166/292 |
| 5,211,234 A | 5/1993 | Floyd | 166/276 |
| 5,213,161 A | 5/1993 | King et al. | 166/293 |
| 5,232,741 A | 8/1993 | Wu | 427/386 |
| 5,232,961 A | 8/1993 | Murphey et al. | 523/414 |
| 5,258,072 A | 11/1993 | Gopalkirshnan et al. | 106/802 |
| 5,293,938 A | 3/1994 | Onan et al. | 166/293 |
| 5,306,739 A | 4/1994 | Lucey | 522/42 |
| 5,314,023 A | 5/1994 | Dartez et al. | 166/295 |
| 5,335,726 A | 8/1994 | Rodrigues | 166/295 |
| 5,337,824 A | 8/1994 | Cowan | 166/293 |
| 5,358,049 A | 10/1994 | Hale et al. | 166/293 |
| 5,358,051 A | 10/1994 | Rodrigues | 166/295 |
| 5,361,841 A | 11/1994 | Hale et al. | 166/293 |
| 5,361,842 A | 11/1994 | Hale et al. | 166/293 |
| 5,363,918 A | 11/1994 | Cowan | 166/295 |
| 5,368,102 A | 11/1994 | Dewprashad et al. | 166/276 |
| 5,372,641 A | 12/1994 | Carpenter | 106/714 |
| 5,373,901 A | 12/1994 | Norman | 166/300 |
| 5,377,757 A | 1/1995 | Ng | 166/277 |
| 5,388,648 A | 2/1995 | Jordan, Jr. | 166/380 |
| 5,428,178 A | 6/1995 | Zuzick et al. | 549/378 |
| 5,447,197 A | 9/1995 | Rae et al. | 166/293 |
| 5,458,195 A | 10/1995 | Totten et al. | 166/293 |
| 5,547,027 A | 8/1996 | Chan et al. | 166/295 |
| 5,547,506 A | 8/1996 | Rae et al. | 106/730 |
| 5,559,086 A | 9/1996 | Dewprashad et al. | 507/219 |
| 5,569,324 A | 10/1996 | Totten et al. | 106/696 |
| 5,588,488 A | 12/1996 | Vijn et al. | 166/293 |
| 5,609,207 A | 3/1997 | Dewprashad et al. | 166/276 |
| 5,629,270 A | 5/1997 | Van Slyke | 507/125 |
| 5,663,123 A | 9/1997 | Goodhue, Jr. et al. | 507/225 |
| 5,688,844 A | 11/1997 | Chatterji et al. | 524/8 |
| 5,692,566 A | 12/1997 | Surles | 166/295 |
| 5,712,314 A | 1/1998 | Surles et al. | 521/41 |
| 5,738,463 A | 4/1998 | Onan | 405/154 |
| 5,795,924 A | 8/1998 | Chatterji et al. | 523/130 |
| 5,820,670 A | 10/1998 | Chatterji et al. | 106/727 |
| 5,873,413 A | 2/1999 | Chatterji et al. | 166/293 |
| 5,875,844 A | 3/1999 | Chatterji et al. | 166/293 |
| 5,875,845 A | 3/1999 | Chatterji et al. | 166/293 |
| 5,875,846 A | 3/1999 | Chatterji et al. | 166/293 |
| 5,911,282 A | 6/1999 | Onan et al. | 175/72 |
| 5,913,364 A | 6/1999 | Sweatman | 166/281 |
| 5,957,204 A | 9/1999 | Chatterji et al. | 166/295 |
| 5,969,006 A | 10/1999 | Onan et al. | 523/166 |
| 6,006,835 A | 12/1999 | Onan et al. | 166/295 |
| 6,006,836 A | 12/1999 | Chatterji et al. | 166/295 |
| 6,059,035 A | 5/2000 | Chatterji et al. | 166/293 |
| 6,098,711 A | 8/2000 | Chatterji et al. | 166/294 |
| 6,124,246 A | 9/2000 | Heathman et al. | 507/219 |
| 6,231,664 B1 | 5/2001 | Chatterji et al. | 106/724 |
| 6,234,251 B1 | 5/2001 | Chatterji et al. | 166/295 |
| 6,244,344 B1 | 6/2001 | Chatterji et al. | |
| 6,258,757 B1 | 7/2001 | Sweatman et al. | 507/219 |
| 6,279,652 B1 | 8/2001 | Chatterji et al. | 166/194 |
| 6,328,106 B1 | 12/2001 | Griffith et al. | 166/295 |
| 6,350,309 B2 | 2/2002 | Chatterji et al. | 106/677 |
| 6,367,549 B1 | 4/2002 | Chatterji et al. | 166/292 |
| 6,401,817 B1 | 6/2002 | Griffith et al. | 166/295 |
| 6,448,206 B1 | 9/2002 | Griffith et al. | 507/219 |

SEALING SUBTERRANEAN ZONES

RELATED U.S. APPLICATION DATA

This is a Divisional of application Ser. No. 09/244,820 filed on Feb. 4, 1999, now U.S. Pat. No. 6,271,181.

BACKGROUND OF THE INVENTION

1. Field of the Invention

The present invention relates to improved compositions for sealing subterranean zones and methods of utilizing the compositions.

2. Description of the Prior Art

In the drilling of oil and gas wells using the rotary drilling method, drilling fluid is circulated through the drill string and drill bit and then back to the surface by way of the well bore being drilled. The drilling fluid maintains hydrostatic pressure on the subterranean zones through which the well bore is drilled and circulates cuttings out of the well bore. During such drilling, subterranean vugs, fractures and other highly permeable zones are often encountered whereby the drilling fluid circulation is lost into the zones and drilling operations must be terminated while remedial steps are taken. Also, when a subterranean zone is penetrated containing fluids under pressure which exceeds the hydrostatic pressure exerted on the zone by the drilling fluid, formation fluid crossflows and/or underground blow-outs can and often do occur.

Heretofore, a variety of compositions have been developed and used for combatting lost circulation, crossflow and underground blow-out problems. However, such compositions have often been unsuccessful due to delayed and inadequate viscosity development by the compositions. For example, a variety of compositions containing hydraulic cement or the like have been used in attempts to stop lost circulation. The lost circulation is usually the result of encountering weak subterranean zones that contain natural fractures and/or are fractured by drilling fluid pressures and rapidly break down. When a cement or other slow setting composition is squeezed into the zone, the delay in developing high viscosity allows the sealing composition to be diluted and displaced into the zone whereby it bypasses the fractures and vugs causing the lost circulation. The same type of problem often occurs when crosslinked hydrated gels and other similar sealing compositions are utilized.

Thus, there is a need for improved compositions and methods of sealing subterranean zones using the compositions that develop ultra high viscosity in a few seconds or minutes and thereafter harden into firm but resilient sealing masses.

SUMMARY OF THE INVENTION

Improved compositions and methods of using the composition for sealing subterranean zones are provided which overcome the deficiencies of the prior art and meet the needs described above. The compositions and methods are particularly suitable for sealing subterranean zones containing oil, water containing divalent cations and/or water-in-oil emulsions, known in the art as inverted emulsions.

The sealing compositions of this invention are basically comprised of water, an aqueous rubber latex, an organophillic clay, sodium carbonate, an epoxy resin and a hardening agent for the epoxy resin. The compositions can also include one or more latex stabilizers, dispersing agents, biopolymers, defoaming agents, foaming agents, emulsion breakers, fillers, rubber vulcanizing agents and the like.

When the sealing compositions of this invention contact oil and water containing divalent cations in the well bore, the rubber latex is destabilized by the divalent cations in the water whereby the rubber is precipitated, and the organophillic clay simultaneously reacts with the oil to instantly form an ultra-high viscosity rubbery mass. The viscous rubbery mass remains in the zone to be sealed until the epoxy resin in the composition is hardened by the hardening agent which forms the composition into a firm but resilient sealing mass which retains its shape, has compressive strength and effectively seals the subterranean zone.

The methods of this invention basically comprise the steps of preparing a sealing composition of this invention, introducing the sealing composition into a subterranean zone to be sealed and allowing the sealing composition to form a firm but resilient sealing mass in the subterranean zone.

It is, therefore, a general object of the present invention to provide improved compositions for sealing subterranean zones and methods of using the compositions.

Other and further objects, features and advantages of the present invention will be readily apparent to those skilled in the art upon a reading of the description of preferred embodiments which follows.

DESCRIPTION OF PREFERRED EMBODIMENTS

As mentioned above, in the drilling of wells, subterranean zones are often encountered which contain high incidences of natural vugs and fractures. As a result, drilling fluid circulation is often lost which requires the termination of the drilling and the implementation of remedial procedures which are often of long duration and high cost. Such remedial procedures have heretofore involved the placement of hardenable compositions such as Portland cement compositions or crosslinked stiff gels and the like in the lost circulation zone. However, as mentioned above, because such compositions require considerable time to harden or gel, successful plugging of the zone often does not take place. In addition to drilling fluid lost circulation zones, zones containing pressurized fluids can be encountered which cause gas, oil and/or water crossflows that dilute and wash away sealing compositions. Also, underground blow-outs at low to high formation fluid flow rates can take place.

The present invention provides improved compositions for sealing subterranean zones and terminating the loss of drilling fluid, cross-flows and/or underground blow-outs. The compositions are particularly suitable for use in wells containing oil, water containing divalent cations and/or water-in-oil emulsions. When a composition of this invention contacts oil and water containing divalent cations in the well bore, it instantly forms a resilient rubbery mass having ultra high viscosity. As the sealing mass is displaced through the well bore, it enters and seals vugs, fractures and other highly permeable zones through which fluid is lost. Upon entering such zones, the highly viscous sealing composition is retained in the zone long enough for the epoxy resin therein to harden which forms a firm but resilient sealing mass which retains its shape, has compressive strength and effectively seals the zone.

The sealing compositions of this invention are self diverting and plug multiple weak zones in a single well treatment. When a well contains a cross-flow or underground blow-out, the sealing compositions plug all the lower pressure weak zones penetrated by the well bore and as the pressure in the well bore is increased, the crossflow or blow-out zone is also plugged. The resulting sealed well bore achieved by the sealing compositions of this invention can hold higher drill-ahead drilling fluid weights and produce a wedging effect in plugged fractures that increases the integrity of the entire formation or zone.

The sealing compositions of the present invention are basically comprised of water, an aqueous rubber latex, an organophillic clay, sodium carbonate, an epoxy resin and a hardening agent for the epoxy resin. The aqueous rubber latex present in the compositions of this invention is caused to destabilize by water in the well bore containing electrolytes such as calcium chloride whereby the rubber is precipitated. The organophillic clay simultaneously reacts with oil in the well bore to form a high viscosity rubbery sealing mass. The sodium carbonate in the compositions functions to stabilize the rubber latex and prevent precipitation when the latex is mixed with water which contains calcium chloride and the like during the preparation of the compositions. Sodium hydroxide can also be added to the compositions to prevent precipitation of the latex if the water used to form the compositions contains magnesium compounds or other similar latex destabilizing compounds.

The epoxy resin in the compositions is caused to harden by the hardening agent therein whereby the initially formed high viscosity rubbery sealing mass is converted into a firm but resilient sealing mass which has compressive strength and retains its shape in a sealed zone.

The water in the sealing compositions which is in addition to the water contained in the aqueous latex is included in the compositions to make the compositions pumpable. The water can be from any source provided it does not contain the above mentioned compounds that adversely affect the rubber latex or other components in the compositions. However, fresh water is preferred. Generally, the additional water is present in an amount in the range of from about 6% to about 50% by weight of the compositions, more preferably in a range of from about 30% to about 42%.

A variety of well known rubber materials can be utilized in accordance with the present invention. Such materials are commercially available in aqueous latex form, i.e., aqueous dispersions or emulsions. For example, natural rubber (cis-1,4-polyisoprene) and most of its modified types can be utilized. Synthetic polymers of various types can also be used including styrene/butadiene rubber, cis-1,4-polybutadiene rubber and blends thereof with natural rubber or styrene/butadiene rubber, high styrene resin, butyl rubber, ethylene/propylene rubbers, neoprene rubber, nitrile rubber, cis-1,4-polyisoprene rubber, silicone rubber, chlorosulfonated rubber, polyethylene rubber, epichlorohydrin rubber, fluorocarbon rubber, fluorosilicone rubber, polyurethane rubber, polyacrylic rubber and polysulfide rubber.

Of the various latexes which can be utilized, those prepared by emulsion polymerization processes are preferred. A particularly preferred latex for use in accordance with this invention is a styrene/butadiene copolymer latex emulsion prepared by emulsion polymerization. The aqueous phase of the emulsion is an aqueous colloidal dispersion of the styrene/butadiene copolymer. The latex dispersion usually includes water in an amount in the range of from about 40% to about 70% by weight of the latex, and in addition to the dispersed styrene/butadiene particles, the latex often includes small quantities of an emulsifier, polymerization catalysts, chain modifying agents and the like. The weight ratio of styrene to butadiene in the latex can range from about 10%:90% to about 90%:10%.

It is understood that styrene/butadiene latexes are often commercially produced as terpolymer latexes which include up to about 3% by weight of a third monomer to assist in stabilizing the latex emulsions. The third monomer, when present, generally is anionic in character and includes a carboxylate, sulfate or sulfonate group. Other groups that may be present on the third monomer include phosphates, phosphonates or phenolics. Non-ionic groups which exhibit stearic effects and which contain long ethoxylate or hydrocarbon tails can also be present.

A particularly suitable styrene/butadiene aqueous latex for use in accordance with the present invention has a styrene/butadiene weight ratio of about 25%:75%, and the styrene/butadiene copolymer is suspended in a 50% by weight aqueous emulsion. A latex of this type is available from Halliburton Energy Services of Duncan, Okla. under the trade designation "LATEX 2000™." The aqueous latex used is included in the compositions of this invention in an amount in the range of from about 8% to about 17% by weight of the compositions, more preferably in an amount of from about 10% to about 12%.

While a variety of organophillic clays can be utilized, an alkyl quaternary ammonium bentonite clay is preferred. A particularly suitable alkyl quaternary ammonium bentonite clay for use in accordance with this invention is commercially available from Southern Products, Inc. of Conzales, Tex. under the tradename "CLAYTONE-II™." The organophillic clay is generally present in the compositions of this invention in an amount in the range of from about 13% to about 22% by weight of the compositions, more preferably from about 16% to about 19%.

The sodium carbonate which functions as a buffer and prevents destabilization of the rubber latex due to contact with calcium and the like in the mixing water is generally present in the compositions in an amount in the range of from about 2.7% to about 4.4% by weight of the compositions, more preferably from 3.3% to about 3.7%.

The compositions of this invention can include various epoxy resins. Preferred epoxy resins are those selected from the condensation products of epichlorohydrin and bisphenol A. A particularly suitable such resin is commercially available from the Shell Chemical Company under the trade designation "EPON®RESIN 828." This epoxy resin has a molecular weight of about 340 and a one gram equivalent of epoxide per about 180 to about 195 grams of resin.

For ease of mixing, the epoxy resin utilized is preferably pre-dispersed in a non-ionic aqueous fluid. A non-ionic aqueous dispersion of the epoxy resin, i.e., the above described condensation product of epichlorohydrin and bisphenol A, is commercially available from the Shell Chemical Company under the trade designation "EPI-REZ®-3510-W-60." Another non-ionic aqueous dispersion of an epoxy resin comprised of a condensation product of epichlorohydrin and bisphenol A having a higher molecular weight than the epoxy resin described above is also commercially available from the Shell Chemical Company under the trade designation "EPI-REZ®-3522-W-60." Yet another non-ionic aqueous dispersion of an epoxy resin suitable for use in accordance with the present invention includes an epoxidized bisphenol A novolac resin which has a one gram equivalent of epoxide per about 205 grams of resin. This non-ionic aqueous dispersion of epoxy resin is commercially available from the Shell Chemical Company under the trade designation "EPI-REZ®-5003-W-55."

Of the foregoing non-ionic aqueous dispersions of epoxy resin, the aqueous dispersion of the condensation product of epichlorohydrin and bisphenol A having a molecular weight of about 340 and a one gram equivalent of epoxide per about 180 to about 195 grams of resin is the most preferred.

The epoxy resin utilized is included in the compositions of this invention in an amount in the range of from about 30% to about 60% by weight of the composition, most preferably in an amount of about 40% to about 50%.

A variety of hardening agents, including, but not limited to, aliphatic amines, aliphatic tertiary amines, aromatic amines, cycloaliphatic amines, heterocyclic amines, amidoamines, polyamides, polyethylamines and carboxylic acid anhydrides can be utilized in the compositions of this invention containing the above described epoxy resins. Of these, aliphatic amines, aromatic amines and carboxylic acid anhydrides are the most suitable.

Examples of aliphatic and aromatic amine hardening agents are triethylenetetraamine, ethylenediamine, N-cocoalkyltrimethylenediamine, isophoronediamine, diethyltoluenediamine, and tris(dimethylaminomethylphenol). Examples of suitable carboxylic acid anhydrides are methyltetrahydrophthalic anhydride, hexahydrophthalic anhydride, maleic anhydride, polyazelaic polyanhydride and phthalic anhydride. Of these, triethylenetetraamine, ethylenediamine, N-cocoalkyltrimethylenediamine, isophoronediamine, diethyltoluenediamine and tris(dimethylaminomethylphenol) are preferred, with isophoronediamine, diethyltoluenediamine and tris(dimethylaminomethylphenol) being the most preferred.

The hardening agent or agents utilized are generally included in the sealing compositions of this invention in an amount in the range of from about 10% to about 20% by weight of the compositions.

Another component which can optionally be included in the sealing compositions of this invention is a polymer which hydrates with water and adds viscosity to the composition to help maintain the solids therein, e.g., the clay, sodium carbonate and epoxy resin, in suspension without adversely affecting the sealing compositions such as by prematurely destabilizing the rubber latex. The polymer is preferably a biopolymer which is not degraded by microorganisms such as bacteria. A particularly preferred biopolymer for use in accordance with this invention which does not adversely affect the sealing compositions is welan gum. When used, the welan gum is included in the compositions in an amount in the range of from about 0.1% to about 0.2% by weight of the compositions.

In order to facilitate the dispersal of solids in the compositions, a dispersing agent can be included therein. While a variety of dispersing surfactants can be used, preferred dispersing surfactants are the condensation reaction product of acetone, formaldehyde and sodium sulfite, the condensation reaction product of sodium naphthalene sulfonate and formaldehyde and sodium-N-methyl-N-oleyltaurine mixed with sulfite liquor. Of these, the condensation reaction product of acetone, formaldehyde and sodium sulfite is most preferred. When used, the dispersing agent is included in the compositions of this invention in an amount in the range of from about 0.35% to about 0.55% by weight of the compositions, more preferably from about 0.4% to about 0.47%.

Another additive which can be utilized is a defoaming agent which prevents foaming during mixing and pumping of the sealing compositions. Because the aqueous rubber latex includes surfactants for emulsifying the latex which also function as foaming agents, a large bubble, unstable foam can be produced when the rubber latex is mixed with water and the other components of the sealing compositions. The defoaming agent can comprise any of the compounds well known for such capabilities such as the polyol silicon compounds. A preferred such defoaming agent is polydimethylsiloxane which is commercially available from Halliburton Energy Services of Duncan, Okla., under the trade designation "D-AIR™3." When used, the defoaming agent is generally included in the sealing compositions in an amount in the range of from about 0.4% to about 1.8% by weight of the compositions, more preferably from about 0.8% to about 1.2%.

In order to prevent the aqueous latex from prematurely coagulating and increasing the viscosities of the sealing compositions of this invention due to contact with coagulation causing compounds in the water used or other source, an effective amount of a latex stabilizing surfactant can optionally be included in the compositions. Latex stabilizing surfactants function to prevent latex coagulation, and those which are particularly suitable for use in accordance with this invention are surfactants having the formula

$$R-Ph-O(O\ CH_2CH_2)_mOH$$

wherein R is an alkyl group having from about 5 to about 30 carbon atoms, Ph is phenyl and m is an integer in the range of from about 5 to about 50. Additional particularly suitable surfactants have the general formula

$$R_1(OR_2)SO_2)_n\ SO_3X$$

wherein $R_1$ is selected from the group consisting of alkyl groups having from 1 to about 30 carbon atoms, cycloalkyl groups having 5 or 6 carbon atoms, $C_1-C_4$ alkyl substituted cycloalkyl groups, phenyl, alkyl substituted phenyl of the general formula $(R_3)_3Ph$- wherein Ph is phenyl, $R_3$ is an alkyl group having from 1 to about 18 carbon atoms and a is an integer of from 1 to 3, and phenyl-alkyl groups wherein the alkyl groups have from 1 to about 18 carbon atoms and the phenyl-alkyl groups have a total of from about 8 to about 28 carbon atoms. $R_2$ is a substituted ethylene group of the formula $-CH_2CH_2R_4$ wherein $R_4$ is selected from hydrogen, methyl, ethyl or mixtures thereof, n is a number from 0 to about 40 provided that when $R_1$ is phenyl or alkyl substituted phenyl n is at least one, and X is any compatible cation.

A preferred surfactant in the above defined group is ethoxylated nonylphenyl containing in the range of from about 20 to about 30 moles of ethylene oxide. Another preferred surfactant in the group is a sodium salt having the general formula

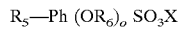

$$R_5-Ph\ (OR_6)_o\ SO_3X$$

wherein $R_5$ is an alkyl group having in the range of from 1 to about 9 carbon atoms, $R_6$ is the group $-CH_2CH_2-$, o is an integer from about 10 to about 20 and X is a compatible cation. Yet another preferred surfactant in the group is a sodium salt having the formula

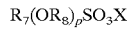

$$R_7(OR_8)_pSO_3X$$

wherein $R_7$ is an alkyl group having in the range of from about 5 to about 20 carbon atoms, $R_8$ is the group $-CH_2CH_2-$, p is an integer in the range of from about 10 to about 40 and X is a compatible cation. A particularly preferred surfactant of this type is the sodium salt of a sulfonated compound derived by reacting a $C_{12}$ to $C_{15}$ alcohol with about 15 moles of ethylene oxide having the formula

$$H(CH_2)_{12-15}\ (CH_2CH_2O)_{15}SO_3Na$$

which is commercially available under the name "AVANEL S150™" from PPG Mazer, Mazer Chemicals, a Division of PPG Industries, Inc., of Gurnee, Ill.

Of the various latex stabilizing surfactants described above which can be used, ethoxylated nonylphenol containing in the range of from about 15 to about 40 moles of ethylene oxide and the sodium salt of a sulfonated and ethoxylated compound having the formula $H(CH_2)_{12-15}(CH_2CH_2O)_{15}SO_3Na$ are preferred, with the latter being the most preferred.

When a latex stabilizing surfactant is included in the sealing compositions of this invention, it is usually added in an amount up to about 35% by weight of the aqueous rubber latex included therein, i.e., in an amount in the range of from about 3% to about 6% by weight of the compositions.

A variety of other components can be included in the sealing composition of this invention to provide particular properties required for specific applications. For example, the polymerized rubber can be vulcanized (crosslinked) by including a vulcanizing agent such as sulfur in the composition. Inert fillers can be included in the sealing compositions to increase the downhole yield of the compositions and/or provide additional hardness to the sealing compositions. Examples of such fillers are silica flour, silica fume, pozzolans and the like. In applications where a well bore is to be plugged and not subsequently drilled out, cement such as Portland cement can be added to the sealing compositions. Another component which can be added to the sealing compositions is a deemulsifying surfactant which functions to break water in oil emulsion drilling fluids. While such an emulsion breaker is generally not needed in that when a sealing composition of this invention contacts inverted emulsion drilling fluids it functions itself to break the drilling fluid into its oil and water components, some inverted emulsions utilizing synthetic oils are very difficult to break and the presence of a separate deemulsifying agent in the sealing composition is helpful.

The sealing compositions can also be foamed with nitrogen or other suitable gas in the presence of a foaming agent and foam stabilizer for reducing the densities of the compositions, preventing fluid loss and aiding in the diversion of the compositions into zones to be sealed. Suitable foaming agents which can be used are one or more sulfonated linear alcohols or a cocoamidobetaine. A suitable foam stabilizer is comprised of a mixture of methoxypolyethylene glycols. As is well understood by those skilled in the art, a variety of other foaming agents and foam stabilizers can also be used.

A particularly preferred sealing composition of this invention is comprised of water present in an amount of from about 30% to about 42% by weight of the composition, an aqueous 25%:75% by weight styrene/butadiene latex which contains water in an amount of about 50% by weight of the latex present in an amount in the range of from about 10% to about 12% by weight of the composition, a latex stabilizer comprised of the sodium salt of a sulfonated and ethoxylated compound having the formula $H(CH_2)_{12-15}(CH_2CH_2O)_{15}SO_3Na$ present in an amount in the range of from about 3% to about 6% by weight of the composition, an alkyl quaternary ammonium bentonite clay present in an amount in the range of from about 15% to about 19% by weight of the composition, sodium carbonate present in an amount in the range of from about 3.3% to about 3.7% by weight of the composition, an epoxy resin comprised of a condensation product of epichlorohydrin and bisphenol A present in an amount in the range of from about 5% to about 20% by weight of the composition, an epoxy resin hardening agent comprised of an aliphatic or aromatic amine present in an amount in the range of from about 10% to about 20% by weight of the composition, welan gum biopolymer present in an amount in the range of from about 0.1% to about 0.2% by weight of the composition, a dispersing agent comprised of the condensation reaction product of acetone, formaldehyde and sodium sulfite present in an amount in the range of from about 0.4% to about 0.47% by weight of the composition and a defoaming agent comprised of polymethylsiloxane present in an amount in the range of from about 0.8% to about 1.2% by weight of the composition.

The sealing compositions of this invention can be prepared in accordance with any of the well Known mixing techniques so long as the latex and latex stabilizing surfactant are not directly admixed without prior dilution by other liquids. In a preferred method, the water used is first introduced into a blender. The defoamer and latex stabilizing surfactant (if used) are then sequentially added with suitable agitation to disperse the constituents. The aqueous dispersion of epoxy resin, the hardening agent for the resin and other liquid additives are then added followed by the clay, sodium carbonate and other dry solids. The mixture is agitated for a sufficient period of time to mix the components and form a pumpable non-foamed slurry. The aqueous rubber latex used is added last and mixed with the sealing composition just prior to pumping the composition.

The methods of this invention for sealing a subterranean zone penetrated by a well bore basically comprise the steps of preparing a subterranean zone sealing composition of this invention comprising water, an aqueous rubber latex, an organophillic clay, sodium carbonate, an epoxy resin and a hardening agent for the epoxy resin, introducing the sealing composition into the subterranean zone by way of the well bore, and then allowing the sealing composition to harden into a firm but resilient sealing mass in the zone. Generally, the sealing composition is prepared in mixing apparatus on the surface and then pumped down the well bore into the zone to be sealed at a high pressure whereby the rubbery mass formed in the well bore is squeezed into fractures and vugs. A fluid pressure above the fracture gradient can also be used in some applications to fracture the zone being sealed and force the sealing composition into the fractures thereby increasing the overall strength of the zone. As mentioned, the sealing composition enters the weakest portions of the zone first followed by other portions including those where fluids crossflow through the well bore or blow-out into the well bore. The sealing composition stops drilling fluid losses and allows high drilling fluid densities to be utilized when needed while drilling ahead. Once the sealing composition has been placed and forms a firm but resilient sealing mass in a subterranean zone, it increases the fracture gradient to a higher level that can eliminate the need for intermediate casing, drilling liners and the like. Because the sealing composition readily diverts to other weak zones in the well bore, the integrity of the entire well bore is improved by the sealing composition.

In some applications it may be necessary to pump an activator fluid, e.g., an aqueous calcium chloride solution and/or oil ahead of the sealing composition into the zone to be sealed so that the sealing composition will react to form a rubbery mass prior to being squeezed into the zone.

In order to further illustrate the compositions and methods of the present invention, the following examples are given.

EXAMPLE

A sealing composition of this invention was prepared comprised of water present in an amount of about 3.32% by weight of the composition, an aqueous 25%:75% by weight styrene/butadiene latex which contained water in an amount of about 50% by weight of the latex present in an amount of about 3.32% by weight of the composition, a latex stabilizer comprised of the sodium salt of a sulfonated and ethoxylated compound having the formula $H(CH_2)_{12-15}(CH_2CH_2O)_{15}SO_3Na$ present in an amount of about 0.67% by weight of the composition, an alkyl quaternary ammonium bentonite clay present in an amount of about 3.6% by weight of the composition, sodium carbonate present in an amount of about 0.36% by weight of the composition, welan gum biopolymer present in an amount of about 0.03% by weight of the composition, a dispersing agent comprised of the condensation reaction product of acetone, formaldehyde and sodium sulfite present in an amount of about 0.05% by weight of the composition and a defoaming agent comprised of polymethylsiloxane present in an amount of about 0.002% by weight of the composition. Three different epoxy resins identified in Table below were combined with portions of the above described compositions along with a diethyltoluenediamine epoxy resin hardening agent in the amounts shown in the Table below. The three compositions were each mixed at 140° F. for time required to reach a viscosity of 100 $B_c$. Portions of the compositions were cured at 140° F. for 72 hours and then tested for compressive strength. Additional portions of the composition were mixed with equal volumes of a water-in-oil emulsion and the resulting mixtures were cured at 140° F. for 72 hours after which their compressive strengths were determined. The results of these tests are shown in the Table below.

TABLE

| Composition Tested | Amount of epoxy resin in the composition, % by weight of the composition | Amount of hardening agent in the composition, % by weight of the composition | Time required at 140° F. to reach 100 $B_c$ viscosity, hr:min | Compressive strengths after 72 hrs at 140° F., psi | |
|---|---|---|---|---|---|
| | | | | without water-in-oil emulsion | with water-in-oil emulsion |
| A[1] | 58 | 12.2 | 4:00 | 40[4] | 12[4] |
| B[2] | 58 | 14.3 | 3:50 | 27[4] | 10[4] |
| C[3] | 58 | 12.2 | 3:50 | 7[4] | 5[4] |

[1] The composition contained an epoxy resin comprised of the condensation product of epichlorohydrin and bisphenol A and was added as a non-ionic aqueous dispersion commercially available from Shell Chemical Company under the trade designation "EPI-REZ ®-3510-W-60."
[2] The composition contained an epoxy resin comprised of the condensation product of epichlorohydrin and bisphenol A and was added as a non-ionic aqueous dispersion commercially available from Shell Chemical Company under the trade designation "EPI-REZ ®-3522-W-60."
[3] The composition contained an epoxy resin comprised of an epoxidized bisphenol A novolac resin and was added as a non-ionic aqueous dispersion commercially available from Shell Chemical Company under the trade designation "EPI-REZ ®-5003-W-55."
[4] The cured composition was firm but resilient and retained its shape.

As can he seen in the Table above, the compositions of the present invention form firm resilient sealing masses which retain their shape and have good compressive strengths.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. An improved method of sealing a subterranean zone penetrated by a well bore comprising the steps of:
   preparing a subterranean zone sealing composition comprising water, about 8–17% by weight of an aqueous rubber latex, about 12–22% by weight of an organophillic clay, about 2.7–4.4% by weight of sodium carbonate, about 50–60% by weight of an epoxy resin, about 10–20% by weight of a hardening agent for said epoxy resin,
   introducing said sealing composition into said zone; and
   allowing said sealing composition to harden into a firm but resilient sealing mass in said zone.

2. The method of claim 1 wherein said water is present in an amount of from about 6% to about 50% by weight of said composition.

3. The method of claim 1 wherein said aqueous rubber latex is an aqueous styrene-butadiene latex.

4. The method of claim 1 wherein said aqueous rubber latex is an aqueous 25%:75% by weight styrene/butadiene latex which contains water in an amount of about 50% by weight of the latex present in an amount in the range of from about 10% to about 12% by weight of said composition.

5. The method of claim 1 wherein said organophillic clay is an alkyl quaternary ammonium bentonite clay.

6. The method of claim 1 wherein said epoxy resin is selected from the group of a condensation product of epichlorohydrin and bisphenol A and an epoxidized bisphenol A novolac resin.

7. The method of claim 1 wherein said hardening agent is a at least one member selected from the group of aliphatic amines, aromatic amines and carboxylic acid anhydrides.

8. The method of claim 1 which further comprises a biopolymer present in an amount in the range of from about 0.1% to about 0.2% by weight of said composition.

9. The method of claim 8 wherein said biopolymer is welan gum.

10. The method of claim 1 which further comprises a dispersing agent present in an amount in the range of from about 0.35% to about 0.55% by weight of said composition.

11. The method of claim 10 wherein said dispersing agent is comprised of the condensation reaction product of acetone, formaldehyde and sodium sulfite present in an amount in the range of from about 0.4% to about 0.47% by weight of said composition.

12. The method of claim 1 which further comprises a latex stabilizer selected from the group consisting of nonylphenol ethoxylated with in the range of from about 15 to about 40 moles of ethylene oxide and the sodium salt of a sulfonated and ethoxylated compound having the formula $H(CR_2)_{12-15}(CH_2CH_2O)_{15}SO_3Na$ present in an amount in the range of from about 3% to about 6% by weight of said composition.

13. The method of claim 1 which further comprises a defoaming agent present in an amount in the range of from about 0.4% to about 1.8% by weight of said composition.

14. The method of claim 13 wherein said defoaming agent is comprised of polymethylsiloxane present in an amount in the range of from about 0.8% to about 1.2% by weight of said composition.

15. An improved method of sealing a subterranean zone penetrated by a well bore comprising the steps of:

preparing a subterranean zone sealing composition comprising:

water present in an amount of from about 30% to about 42% by weight of said composition, an aqueous 25%:75% by weight styrene/butadiene latex which contains water in an amount of about 50% by weight of the latex present in an amount in the range of from about 10% to about 12% by weight of said composition, a latex stabilizer comprised of the sodium salt of a sulfonated and ethoxylated compound having the formula $H(CH_2)_{12-15}(CH_2CH_2O)_{15}SO_3Na$ present in an amount in the range of from about 3% to about 6% by weight of said composition, an alkyl quaternary ammonium bentonite clay present in an amount in the range of from about 16% to about 19% by weight of said composition, sodium carbonate present in an amount in the range of from about 3.3% to about 3.7% by weight of said composition, an epoxy resin comprised of a condensation product of epichlorohydrin and bisphenol A present in an amount in the range of from about 30% to about 60% by weight of said composition, an epoxy resin hardening agent comprised of an aliphatic or aromatic amine present in an amount in the range of from about 10% to about 20% by weight of said composition, welan gum biopolymer present in an amount in the range of from about 0.1% to about 0.2% by weight of said composition, a dispersing agent comprised of the condensation reaction product of acetone, formaldehyde and sodium sulfite present in an amount in the range of from about 0.4% to about 0.47% by weight of said composition, and a defoaming agent comprised of polymethylsiloxane present in an amount in the range of from about 0.8% to about 1.2% by weight of said composition;

introducing said sealing composition into said zone; and allowing said sealing composition to harden into a firm but resilient sealing mass in said zone.

* * * * *